Aug. 23, 1966
F. J. STEINMETZ
3,267,964
APPARATUS FOR AUTOMATIC DILUTION
OF MEASURED CONCENTRATES
Filed April 26, 1963
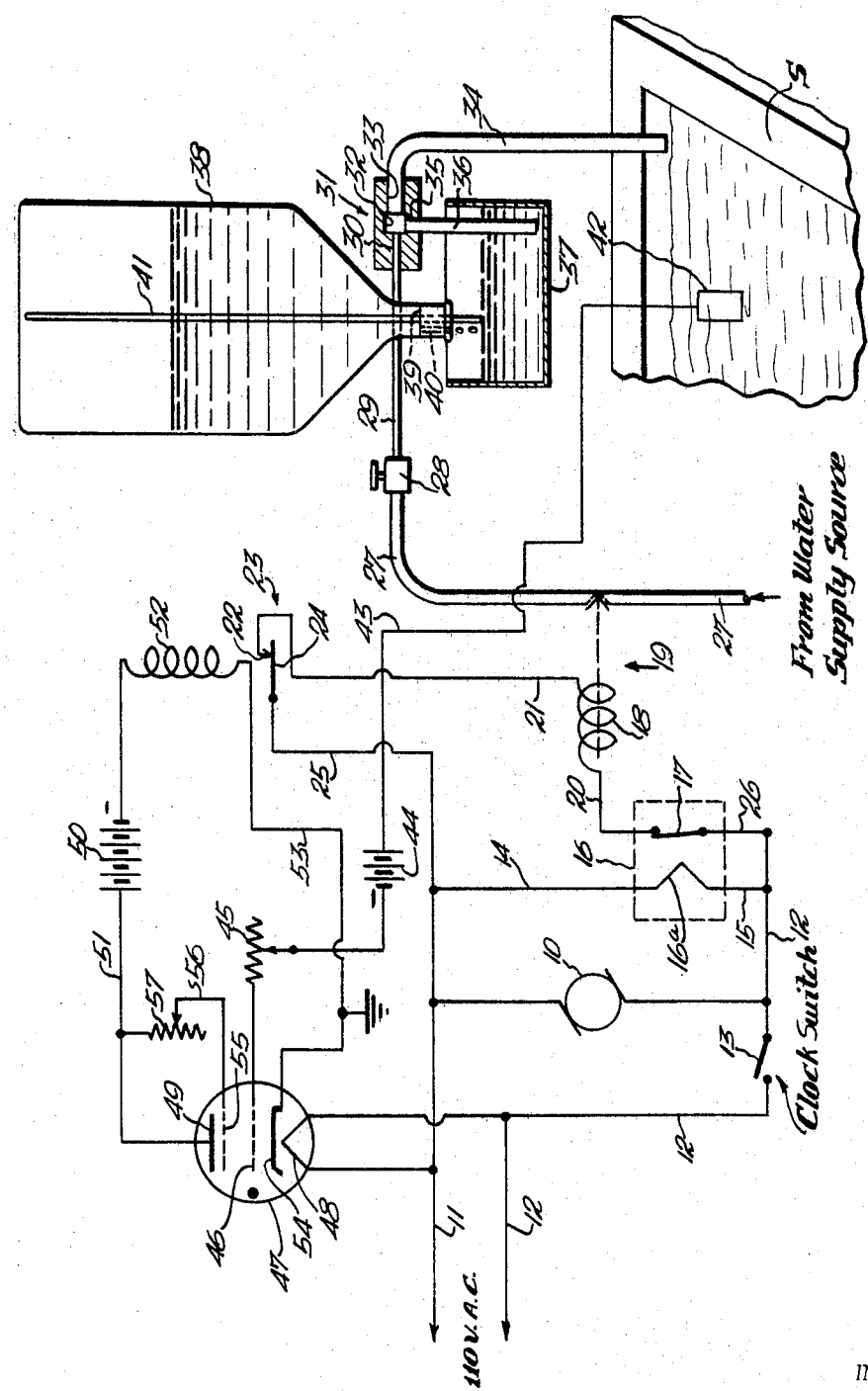
INVENTOR.
FRED J. STEINMETZ
BY E.H. Schmidt, Atty.

United States Patent Office 3,267,964
Patented August 23, 1966

3,267,964
APPARATUS FOR AUTOMATIC DILUTION OF MEASURED CONCENTRATES
Fred J. Steinmetz, 2241 Jamaica Drive, Miramar, Fla.
Filed Apr. 26, 1963, Ser. No. 275,889
4 Claims. (Cl. 137—624.13)

My invention relates to apparatus for automatically diluting measured quantities of liquid concentrates and is directed particularly to such apparatus for automatically chlorinating and/or otherwise chemically treating swimming pool installations for continuously maintaining water that is safe and healthful for swimming.

At the present time it is common practice, particularly in home swimming pool installations, to periodically add chemicals, such as chlorine or acids, to maintain the water at a low bacteria level safe for swimming. This procedure, which is usually done manually, is hazardous because of the caustic nature of the chemical concentrates used. If the pool is used often, moreover, the addition of chemicals in a large pool becomes a daily necessity, and thus a time consuming and disagreeable chore.

It is accordingly the principal object of my invention to provide a device for automatically adding measured amounts of liquid chemical concentrates to swimming pools on a daily basis in order that the pool be properly maintained for healthful swimming without the necessity for adding chemicals by hand.

It is a more particular object to provide chemical adding apparatus of the character above wherein the liquid concentrates are diluted with fresh water added to the pool in ratios and in quantities that can be adjusted to suit the needs of the pool.

Still another object is to provide a device for chemically treating pools which includes protective means preventing the oversupply of diluted chemical concentrate in case of failure of the mechanism controlling the amount of diluted concentrate being supplied to the pool in a given time interval or cycle.

Yet another object is to provide apparatus for automatically chemically treating swimming pools which can be operated in conjunction with the usual automatic pool filter system and thus controlled in part by the mechanism thereof.

Still another object is to provide an apparatus of the above nature which will be low in cost, simple in structure and operation and long-wearing in use.

Other objects, features and advantages of the invention will be apparent from the following description when read with reference to the accompanying drawing, in which the single figure illustrates, schematically, pool treating apparatus embodying the invention.

Referring now to the drawing, 10 designates the electric pump motor of a pool filter, the same being energized by the usual 110 or 220 volt alternating current source of household supply through a pair of electrical conductors 11, 12, conductor 12 of which has series-connected a clock switch, indicated at 13, serving to energize said pump motor for a predetermined period once during every cycle of operation. The construction and operation of clock-switch controlled pool filters being well known, such apparatus is not further described herein, only so much being shown and described as is necessary to illustrate a preferred form of my invention wherein use is made of the clock switch associated with the filter apparatus to avoid the use of a separate clock switch. Connected in parallel with the pump motor 10, as by conductors 14, 15, so as to be energized simultaneously therewith upon closure of the clock switch 13, is a thermally-controlled time delay relay 16 having a normally-closed bi-metallic electrical switch 17 adapted to open-circuit at a short interval of time after energization of said relay, which interval may be one to two minutes, for example. This interval is shorter than the interval of energization for the pump motor 10, the termination of which is controlled by the clock switch 13. One terminal of the energization winding 18 of a solenoid-controlled valve 19 is connected, as by conductor 20, to one terminal of the time delay relay switch 17, and the other terminal of said energization winding is connected, as by conductor 21, to the fixed terminal 22 of a single-pole, single-throw switch associated with an electrical relay 23. The movable arm terminal 24 of the relay 23 is connected, as by conductor 25, to conductor 11, and thus to the source of supply. The remaining terminal of the thermally-controlled time delay relay switch 17 is connected, as by conductor 26, to conductor 12. The switch of the electrical relay 23 is normally closed-circuited and becomes open-circuited only upon malfunction of the apparatus, or when the demand for chemical is less, as will be hereinbelow more fully described.

The solenoid-controlled valve 19 is arranged in a pipe or conduit 27 leading from a continuous supply of fresh water under substantially constant pressure, such as the household water supply line, and serves normally to shut off water fed through said line to an adjustable metering valve 28. Water flowing through the metering valve 28 passes through a conduit 29 to the input channel or nozzle 30 of an injector 31. The input nozzle 30 terminates at its inner end with one side of a vacuum cavity 32 of increased diameter. The other side of the vacuum cavity 32 communicates with an output channel 33, also of greater diameter, through the input nozzle 30, which, in turn, is connected with a conduit 34 discharging at any convenient location into the swimming pool S. The injector 31 is also provided with a channel 35 extending downwardly from the vacuum cavity 32 and connected with a conduit 36 leading into a container 37 holding a supply of liquid concentrate, which may be liquid chlorine for example, to be diluted with the source of water supply and discharged into the pool.

In operation, closure of the pool filter pump motor clock switch 13, which may occur once or more during every twenty-four hour period for example, will complete a circuit to energize the energization winding 18 of the solenoid-controlled valve 19. This circuit can be traced through conductor 11 leading from one terminal of the source of electrical supply, through the normally-closed switch 22, 24 associated with relay 23, through conductor 21 to one terminal of the energization winding 18, the other terminal of said energization winding being connected through conductor 20, normally-closed time delay relay switch 17, conductor 26 and conductor 12 through now closed clock switch 13 to the other terminal of the source of electrical supply. Since the heater element 16a of the time delay relay 16 will open its associated switch 17 at the end of a short, predetermined interval of time after being energized, it will be understood that the above described energization circuit for the solenoid winding 18 will remain closed, during each period of operation of the pump motor 10, only for that short interval of time initiated by closure of the clock switch 13 and terminated by the subsequent opening of said switch 17. During such intervals, energization of the solenoid winding 18 will actuate the solenoid-controlled valve 19 to allow water under pressure in the conduit 27 to flow through to the metering valve 28 and thence through the input nozzle 30 of the injector 31. The water under pressure thereby injected into the vacuum cavity 32 will, by venturi effect, create a partial vacuum therein to cause the liquid chlorine or other chemical in the container 37 to be drawn into said cavity and mixed with the water, to be discharged through the output channel 33 and conduit 34 into the swimming pool S. Thus, by controlling the length of time that the thermally controlled time delay relay remains closed-circuited (by appropriate adjustment or substitution of the unit), and the setting of the metering valve 28 to adjust the volume of water delivered to the injector 31 during each interval, it is possible to control, over a wide range, the amount of chlorine or other chemical diluted and delivered during the interval of operation, to suit the size and needs of any particular swimming pool.

Protective means is provided to prevent the over-supply of chemical to a pool in case of failure of the solenoid-controlled valve to shut off automatically for any reason. To this end, the liquid concentrate level in the container 37 is automatically limited so that the amount contained at any time will be no more than that required in one cycle of operation of the pool filter pump motor, and is slowly replenished over the next period after its use as described above. This is accomplished by having a supply carboy 38 of the liquid concentrate inverted over the container 37 and stoppered by a stopper 39 in which a small opening 40 permits dripping of the chemical into said container only when replacement air can be admitted, and where replacement of air in the carboy is effected through a tube 41 extending through said stopper and down to the desired "full" level of the concentrate in the container 37. It will be apparent that with this arrangement, no more liquid concentrate than required during one cycle of operation can be discharged into the pool, no matter how long the solenoid-controlled valve 19 remains open.

Additional or alternative means preventing the over-supply of chemical to a pool in case of failure of the thermally-controlled relay 16 or in case the pool requires less chemical concentrate is also provided in the form of an electronic circuit controlled by the ionic concentration and thus the electrolytic resistance of the pool water. To this end, an electrode 42 submerged in the pool at a convenient fixed location is connected, as by conductor 43 and in series with a source of negative bias voltage 44 and a sensitivity adjustment variable resistor 45 to the control grid 46 of a thyratron 47, which may for example, be a type 2D21 having a 110 volt heater 48 connected directly across the source of voltage supply 11, 12. The plate 49 of the thyratron 47 is connected in series with a source of plate voltage supply 50, as by conductor 51, to one terminal of the energization coil 52 of the relay 23, the other terminal of said coil being returned, as by conductor 53, to ground. The indirectly-heated cathode 54 of the thyratron 47 is also connected to ground, to complete the plate circuit. The screen grid 55 is connected as by conductor 56 to the source of plate voltage supply 50 through a variable grid resistor 57, which serves as an adjustment controlling the sensitivity of the device. In operation, the grid and screen variable resistors 45, 47, respectively, are adjusted so that the thyratron 47, which has a sharp cut-off characteristic, will normally be conducting. Thus, current will normally flow in the plate circuit to energize the relay 23 to close-circuit the associated switch 22, 24. If an over-supply of chemical should for any reason be fed into the pool, however, the increased ionic concentration thereby resulting will cause an increased current flow in the grid circuit of the thyratron 47, providing a voltage drop in the variable resistor 45 of the same polarity as that of the bias supply 44 and sufficient to cause the plate circuit of said thyratron to be cut off, thereby de-energizing the relay 23 and open-circuiting the switch 22, 24. It will be understood that the swimming pool S is in the ground, and that the grounding of the pool water to earth is effected through the supply and drain conduits and through the swimming pool walls. The opening of the switch 22, 24 in turn opens the energization circuit to the solenoid controlled valve 19, hereinabove described, causing the associated valve to shut off the flow of water being fed through the water supply conduit 27.

While I have illustrated and described herein only one form in which the invention may conveniently be embodied in practice, it is to be understood that this form is given by way of example only and not in a limiting sense. Thus, while I have described use of the apparatus for the addition of diluted liquid chlorine or acid to a swimming pool, it could also be used with other chemicals, or a plurality of chemicals individually supplied to a swimming pool or any other utilization system. Also, instead of using a thermally actuated relay switch to control the interval of operation of the supply water solenoid controlled valve, any other time controlled switching device could alternatively be employed. The invention, in brief, comprises all the modifications and embodiments coming within the scope of the following claims.

What I claim as new and desire to secure by Letters Patent is:

1. Apparatus for automatic dilution of measured concentrates comprising, in combination, an injector member having an interior cavity, an input channel in said injector member and having at one end an injector nozzle opening communicating with one side of said interior cavity, an output channel in said injector member and having an opening at one end communicating with the other side of said interior cavity, a concentrate input channel in said injector member having an opening at one end communicating with the interior of said interior cavity, a container for holding a quantity of liquid concentrate, conduit means communicating between said concentrate input channel and the interior of said container, input conduit means leading from a source of water under pressure and communicating with the other end of said input channel, a normally closed valve in said input conduit means, and means for automatically opening said valve periodically for an interval of time, whereby water under pressure will be periodically injected into said cavity to produce a partial vacuum therein serving to draw liquid concentrate from said container into said cavity to be diluted with the water and discharged through said discharge channel, said container containing a supply of concentrate only sufficient to supply a predetermined volume for one of said periodic time intervals, and means for automatically refilling said container with concentrate at an even rate during intervals between said periodic time intervals.

2. Apparatus for automatic dilution of measured concentrates as defined in claim 1, wherein said automatic refilling means comprises a second container of liquid concentrate arranged above said first container, a small opening in said second container operative to drip concentrate into said first container when air is admitted into said second container for replacing the concentrate, and an air vent tube extending down from the interior of said second container to the "full" level of said first container to be automatically sealed upon the concentrate in said first container reaching said "full" level.

3. Apparatus for automatic dilution of measured concentrates as defined in claim 1, wherein said means for automatically opening said valve comprises a solenoid, and energization means for said solenoid, said energization means comprising a clock-operated switch.

4. Apparatus for automatic dilution of measured concentrates as defined in claim 3, wherein said energization means further comprises a thermally-controlled time delay device actuated by said clock-operated switch.

References Cited by the Examiner
UNITED STATES PATENTS

| | | | |
|---|---|---|---|
| 2,372,544 | 3/1945 | Borman et al. | 119—77 X |
| 2,395,150 | 2/1946 | Sloan et al. | 137—624.13 X |
| 2,874,714 | 2/1959 | Pellerin et al. | 137—93 |
| 3,014,178 | 12/1961 | Dunn | 137—5 |
| 3,095,121 | 6/1963 | Douty et al. | 137—93 |

WILLIAM F. O'DEA, *Primary Examiner.*

ISADOR WEIL, *Examiner.*

D. ZOBKIW, *Assistant Examiner.*